(12) United States Patent
Caruel

(10) Patent No.: US 9,074,554 B2
(45) Date of Patent: Jul. 7, 2015

(54) REVERSE THRUST DEVICE

(75) Inventor: Pierre Caruel, Le Havre (FR)

(73) Assignee: AIRCELLE, Gonfreville L'Orcher (FR)

( * ) Notice: Subject to any disclaimer, the term of this patent is extended or adjusted under 35 U.S.C. 154(b) by 581 days.

(21) Appl. No.: 13/500,176

(22) PCT Filed: Oct. 22, 2010

(86) PCT No.: PCT/FR2010/052262
§ 371 (c)(1),
(2), (4) Date: Apr. 4, 2012

(87) PCT Pub. No.: WO2011/055056
PCT Pub. Date: May 12, 2011

(65) Prior Publication Data
US 2012/0193448 A1  Aug. 2, 2012

(30) Foreign Application Priority Data
Nov. 5, 2009 (FR) ...................................... 09 05294

(51) Int. Cl.
*F02K 1/54* (2006.01)
*F02K 1/72* (2006.01)
*F02K 1/76* (2006.01)

(52) U.S. Cl.
CPC . *F02K 1/72* (2013.01); *F02K 1/763* (2013.01); *F05D 2250/314* (2013.01); *F05D 2260/50* (2013.01)

(58) Field of Classification Search
CPC ............. F02K 1/54; F02K 1/56; F02K 1/566; F02K 1/605; F02K 1/62; F02K 1/625; F02K 1/70; F02K 1/72; F02K 1/09; F02K 1/763; F02K 1/766
USPC .................. 60/770, 771, 226.1, 226.2, 226.3; 239/265.11–265.43
See application file for complete search history.

(56) References Cited

U.S. PATENT DOCUMENTS 3,614,037 A    10/1971  Vdolek
4,145,877 A *  3/1979  Montgomery ............... 60/226.2
(Continued)

FOREIGN PATENT DOCUMENTS

FR    2133520 A1    12/1972
FR    2163688 A1    7/1973

OTHER PUBLICATIONS

International Search Report issued Mar. 1, 2011 by European Patent Office re: PCT/FR2010/052262; pp. 3; citing: US 4,313,851 A, US 4,767,055 A, FR 2 163 688A1, US 3,614,037 A, US 5,309,711 A and FR 2 133 520 A1.

*Primary Examiner* — Phutthiwat Wongwian
*Assistant Examiner* — Steven Sutherland
(74) *Attorney, Agent, or Firm* — Brinks Gilson & Lione

(57) ABSTRACT

The invention relates to a jet engine nacelle reverse thrust device (10) including a means for diverting at least one portion of a jet engine air flow and moreover includes at least one cowl (20) that is translatable in a direction substantially parallel to a longitudinal axis of the nacelle, the device having at least one flap (30) that is pivotably mounted, by one end, onto the translatable cowl, said translatable cowl (20) being capable of passing alternately from a closed position, wherein said cowl, with the flap (30) in a retracted position, ensures the aerodynamic continuity of the nacelle and covers the diverting means, to an open position, wherein said cowl opens a passage in the nacelle and uncovers the diverting means, the flap (30) being in a pivoted position wherein it is capable of sealing off a portion of an annular channel of the nacelle. The device also includes a system (40) for driving the flap (30), said system including at least one assembly forming a lever (50) that is pivotably mounted onto the cowl (20) and is hinged to each of the ends thereof by means of drive rods (61, 62), respectively located on the flap (30) and on a stationary structure (1) of the device.

13 Claims, 5 Drawing Sheets

(56) References Cited

U.S. PATENT DOCUMENTS

| | | | |
|---|---|---|---|
| 4,216,926 A | * | 8/1980 | Lawson .................... 244/110 B |
| 4,313,851 A | | 2/1982 | Barfurth et al. |
| 4,767,055 A | | 8/1988 | Ward |
| 4,807,434 A | * | 2/1989 | Jurich ......................... 60/226.2 |
| 5,309,711 A | | 5/1994 | Matthias |
| 5,778,659 A | * | 7/1998 | Duesler et al. ............... 60/226.1 |
| 5,806,302 A | * | 9/1998 | Cariola et al. .................. 60/204 |

* cited by examiner

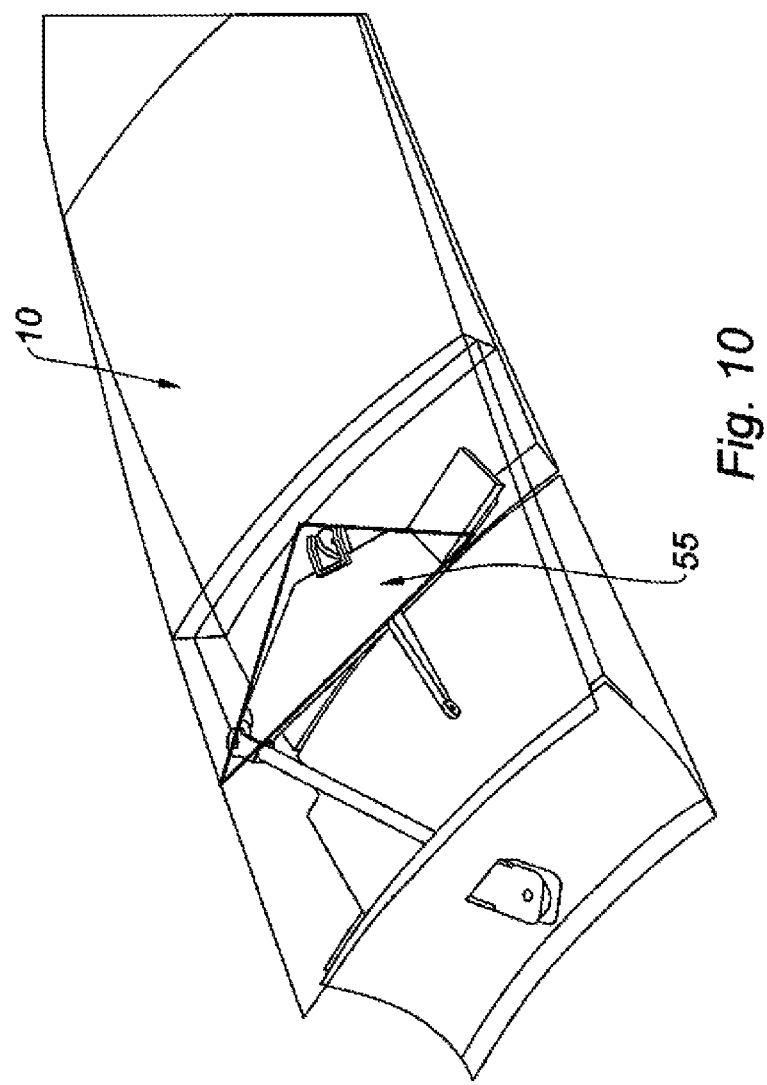

REVERSE THRUST DEVICE

TECHNICAL FIELD

The invention relates to a so-called grid reverse thrust device, for a reaction motor.

BRIEF DISCUSSION OF RELATED ART

An airplane is moved by several jet engines each housed in a nacelle also housing a set of related actuating devices related to its operation and performing various functions when the jet engine in operating or stopped. These related actuating devices in particular comprise a mechanical thrust reverser system.

A nacelle generally has a tubular structure comprising an air intake upstream of the jet engine, a middle section intended to surround a fan of the jet engine, a downstream section housing the thrust reverser means and designed to surround the combustion chamber of the jet engine, and generally ends with a jet nozzle whereof the outlet is situated downstream of the jet engine.

Modern nacelles are designed to house a dual-flow jet engine capable of generating, via the blades of the rotary fan, a flow of hot air (also called primary flow) coming from the combustion chamber of the jet engine, and a flow of cold air (secondary flow) that circulates outside the jet engine through an annular passage, also called a tunnel, formed between a fairing of the jet engine and an inner wall of the nacelle. The two flows of air are discharged from the jet engine through the back of the nacelle.

The role of a thrust reverser is, during landing of an airplane, to improve the braking capacity thereof by reorienting at least part of the thrust generated by the jet engine forward. In this phase, the reverser obstructs the tunnel of the cold flow and orients said flow toward the front of the nacelle, thereby generating a counter-thrust that is added to the braking of the airplane's wheels.

The means used to perform this reorientation of the cold flow vary depending on the type of reverser. However, in any case, the structure of a reverser comprises mobile cowls that can be moved between a deployed position in which they open a passage in the nacelle intended for the diverted flow on the one hand, and a retracted position in which they close that passage on the other hand. These cowls can perform a bypass function or simply activate other bypass means.

In the case of a grid reverser, the reorientation of the air flow is done by cascade vanes, the cowl only having a simple sliding function intended to uncover or cover said vanes. Additional blocking doors, also called flaps, activated by the sliding of the cowling, generally make it possible to close the tunnel downstream of the vanes so as to make it possible to reorient the cold flow toward the vanes.

These flaps are pivotably mounted on the cowl sliding between a retracted position in which they ensure, with said mobile cowl, the aerodynamic continuity of the inner wall of the nacelle and a deployed position in which, in a thrust reversal situation, they at least partially cover the annular channel so as to divert a gas flow toward the cascade vanes uncovered by the sliding of the mobile cowl.

The pivoting of the flaps is guided by rods connected to the flap on the one hand, and to a stationary point of the inner structure defining the annular channel on the other hand.

Such a configuration of the prior art has several problems, i.e. in particular problems with the different opening kinematics between the translation of the cowling and the pivoting of the flaps, problems with aerodynamic disruptions due to the driving rods passing through the tunnel, acoustic performance problems due to the installation of stationary articulation points, which reduces the surface area of the inner structure that can be used for acoustic treatment, and mechanical problems due to the mechanical connection by the rods between the thrust reverser and the inner structure.

The issue of the kinematics of the degree of opening of the flaps relative to the sliding of the cowl and, consequently, the management of the total air passage section is a particularly important point.

In fact, during a transition phase between opening and closing of the thrust reverser, the opening of the flaps, at the beginning of the opening phase of the mobile cowl, is faster than the withdrawal of said cowl.

A sensitive kinematic point often exists that places the flap in a position partially obstructing the annular channel without the obstructed section being completely offset by the uncovered upstream section by the withdrawal of the mobile cowl.

The upstream passage section through the grids of the reverser being smaller than the section of the tunnel that is covered by the flaps, there is an increase in the pressure in the engine, which involves a delicate management of the rating of the jet engine in this transitional phase.

Several solutions have been established so as to resolve one or more of these problems.

It is thus known to propose a reverser architecture no longer comprising rods passing through the annular channel.

For example, this aim can be achieved by providing driving rods hinged to the mobile flap and connected close to the rear frame of the cascade vanes.

However, such an architecture is unsuited to jet engines with a high bypass ratio.

In fact, with this type of jet engine, the length of the vanes and, therefore, the movement of the cowl in the downstream direction of the nacelle to uncover them must be significant.

However, due to a lack of available space in the nacelle, the length of the rods may not be sufficient to achieve suitable opening kinematics for the flaps and the cowl.

The flap is then deployed very quickly in the annular channel as of the beginning of the backward travel of the sliding cowl, causing a significant pressure increase in the annular channel.

It therefore does not resolve the problem of adequate management of the total air passage section in the nacelle.

Other devices are also known that make it possible to adapt the opening kinematics of the flap relative to the withdrawal kinematics of the cowl, in particular by implementing a certain delay in opening the flap, thereby preventing a pressure increase in the tunnel.

However, the opposite drawback occurs, the upstream air passage section through the grids of the reverser, added to that of the two direct jet flows being too significant relative to the air intake section of the nacelle. Such a situation is also detrimental to the jet engine.

Furthermore, other devices proposing an architecture without connecting rods in the tunnel provide for flaps sliding along adapted rails via rollers, along the mobile cowl during its movement in the downstream direction of the nacelle.

However, these devices have insufficiencies from a mechanical reliability perspective, as they are subject to wear of the mobile parts, such as the rollers, the forces being applied periodically on very small contact surfaces.

As a result, there is a need to improve reverse thrust devices without rods in the annular channel so as to offset the aforementioned limitations.

BRIEF SUMMARY

One aim of the present invention is to propose a reverse thrust device without rods in the annular channel adapted to jet engines with a high bypass ratio responding to the aforementioned problems.

Another aim of the present invention is to propose a reverse thrust device without connecting rods in the annular channel having a system for driving the blocking flaps that is both simple and reliable.

Another aim of the present invention is to propose a reverse thrust device without rods in the annular channel in which the opening kinematics of the flaps are managed and the sliding cowl is controlled during the thrust reversal so as to ensure a total exhaust section that is always sufficient relative to the air intake section.

It is also desirable to propose a reverse thrust device without rods in the annular channel in which the opening kinematics of the flaps and cowl are simultaneous, while having a practically constant air exhaust section irrespective of its usage condition, in particular in direct jet, in transit and in reversed jet.

Another aim of the present invention is to propose a reverse thrust device limiting any wear of these moving parts.

Another aim of the present invention is to propose a reverse thrust device without rods in the annular channel in which the impact of the system for driving the flaps on the structure of the mobile cowl and its sealing are limited.

To that end, the invention proposes a jet engine nacelle reverse thrust device including a means for diverting at least one portion of a jet engine air flow, and moreover including at least one cowl that is translatable in a direction substantially parallel to a longitudinal axis of the nacelle, the device having at least one flap that is pivotably mounted, by one end, onto the translatable cowl, said translatable cowl being capable of passing alternately from a closed position, wherein said cowl, with the flap in a retracted position, ensures the aerodynamic continuity of the nacelle and covers the diverting means, to an open position, wherein said cowl opens a passage in the nacelle and uncovers the diverting means, the flap being in a pivoted position wherein it is capable of sealing off a portion of an annular channel of the nacelle, remarkable in that it also includes a system for driving the flap, said system including at least one assembly forming a lever that is pivotably mounted onto the cowl and is hinged to each of the ends thereof by means of drive rods, respectively located on the flap and on a stationary structure of the device.

Owing to the present invention, there are no flap driving rods placed in the tunnel and the opening kinematics of the flap and the cowl are controlled so as to have an air exhaust section in the nacelle that is practically constant, in particular when the reverse thrust device is in a beginning-of-transit configuration in which the opening of the deviating means by translating the mobile cowl is small.

According to specific embodiments of the invention, the device can comprise one or more of the following features, considered alone or in any technically possible combination:

- the assembly forming the lever comprises first and second lever arms, each respectively fastened, via driving rods, on a front frame and on the flap and pivotably mounted on the cowl;
- the assembly forming the lever is placed in a plane containing the hinge pin of the flap and an axis parallel to the longitudinal axis of the device;
- the kinematics for changing the position of the flap depend on the first and second angles respectively formed by the first and second lever arms with a hinge pin of the flap;
- the first angle is smaller than the second angle;
- the first and second lever arms are secured in rotation;
- the first lever arm has a length longer than that of the second lever arm;
- the device also comprises means for guiding the rotation of the assembly forming a lever;
- the means for guiding the rotation of the assembly forming the lever comprises at least one guide rail secured with the cowl and centered on the axis of rotation of the first and second lever arms, said guide rail being intended to cooperate with sliding means with a complementary shape formed on the first or second lever arm;
- the means for guiding the assembly forming the lever in rotation comprises at least one guide rail secured to the cowl and centered on the axis of rotation of the first and second lever arms, said guide rail being intended to cooperate with sliding means with a complementary shape formed on the first and second lever arms so that the first and second lever arms successively slide along said guide rail;
- the second driving rod forms a ball joint connection with the flap and the second lever arm;
- the assembly forming the lever and the means for guiding the rotation of said assembly are placed under a sealing membrane placed upstream of the cowl.

The invention also relates to a dual flow jet engine nacelle comprising a device as mentioned above.

BRIEF DESCRIPTION OF THE DRAWINGS

Other features, aims and advantages of the present invention will appear upon reading the following detailed description, according to embodiments provided as non-limiting examples, and in reference to the appended drawings, in which:

FIG. 10 is a partial perspective view of a reverse thrust device according to a second embodiment of the present invention.

DETAILED DESCRIPTION

Figure 1:
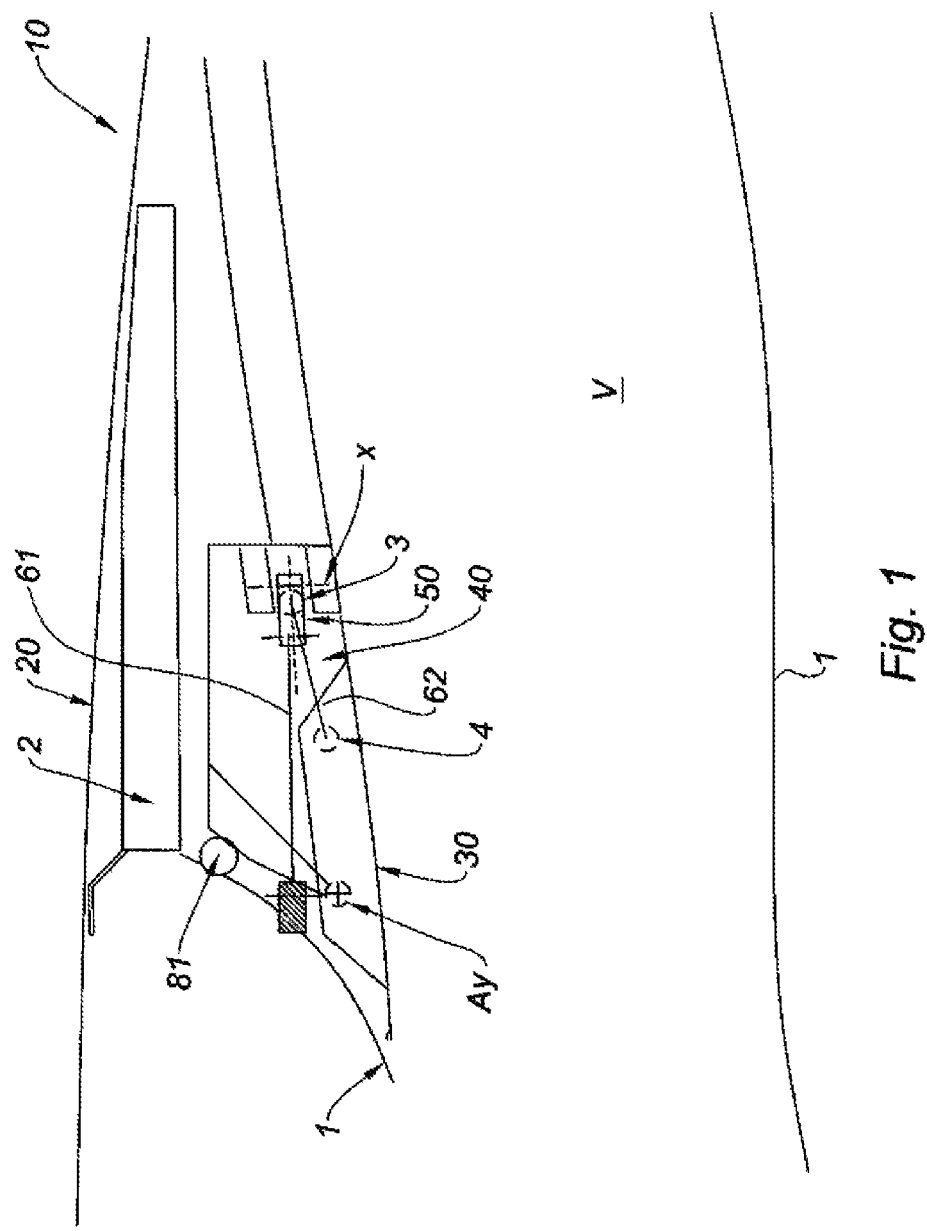
FIG. 1 is a longitudinal cross-sectional view of a reverse thrust device according to a first embodiment of the present invention.
Figure 2:
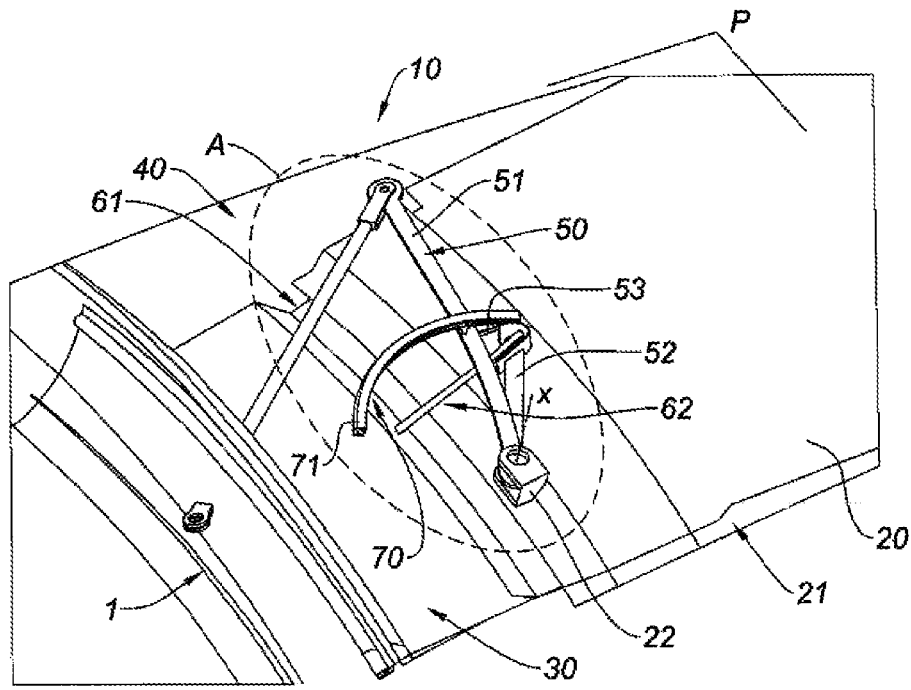
FIG. 2 is a partial perspective view of the reverse thrust device according to a first embodiment of the present invention of FIG. 1.

In a known manner, a reverse thrust device designated by general reference 10 in FIGS. 1 and 2 is associated with a dual flow jet engine and belongs to an external nacelle which defines, with a concentric inner structure 1, an annular flow channel or tunnel V of a secondary flow of the jet engine.

As illustrated in FIGS. 1 and 2, the reverse thrust device 10 comprises a stationary front frame 1 extended by a cowl 20 slidingly mounted using guideways, along the longitudinal axis of the nacelle.

The front frame 1 supports a plurality of cascade vanes 2 housed in the thickness of the mobile cowl 20, when the latter is in the closed position.

The translation of the mobile cowl 20 in the downstream direction of the nacelle frees an opening therein through which the secondary flow of the jet engine can escape at least partially, this flow portion being reoriented toward the front of the nacelle by the cascade vanes 2, thereby generating a counter-thrust that can help with the braking of the airplane.

In order to increase the portion of the secondary flow passing through the vanes 2, the reverse thrust device 10 comprises a plurality of reverser flaps 30, distributed over the circumference of the cowl 20 and each mounted pivoting by one end around a hinge pin, on the sliding cowl 20 between a retracted position in which the flap 30 closes the opening and ensures the inner aerodynamic continuity of the tunnel V and a deployed position in which, in a thrust reversal situation, it at least partially covers the tunnel V so as to divert a flow of gas toward the vane opening 2.

During direct thrust operation of the jet engine, the sliding cowl 20 forms all or part of the downstream portion of the nacelle, the flaps 30 then being retracted in the sliding cowl 20, which covers the vane opening 2.

To reverse the thrust of the jet engine, the sliding cowl 20 is moved in the downstream position and the flaps 30 pivot in the covering position so as to deviate the secondary flow toward the vanes 2 and form a reversed flow guided by the vanes 2.

It should be noted that in the embodiment illustrated in the figures, the pivoting of the flap 30 around its hinge pin Ay transverse to the longitudinal axis of the nacelle is done owing to ball joint links, at the upstream end thereof. It is of course possible to hinge the flap 30 downstream in the tunnel V by its downstream end.

In reference to FIGS. 1 to 4, the reverse thrust device 10 must therefore be equipped with a system 40 making it possible to drive the flaps 30 relative to the cowl 20 with appropriate kinematics.

To that end, and according to the invention, the driving system 40 of the flap 30 comprises at least one lever assembly 50 pivotably mounted on the mobile cowl 20 and hinged at each of its ends, via driving rods, respectively to the flap 30 and the stationary structure of the device, i.e. the front frame 1.

Such a drive system 40 makes it possible to convert the translational movement of the cowl 20 in the downstream direction of the nacelle (and reversibly, in the upstream direction of the nacelle) into a rotational movement of the assembly forming the lever 50, said rotational movement then being returned to actuate the driving rod(s) so as to pivot the flap 30 in a particular position such as its deployed position, its retracted position, or any so-called transit position between the two aforementioned positions.

More specifically, the lever assembly 50 comprises two distinct lever arms 51 and 52 forming a general V shape whereof the tip is pivotably mounted around a pivot axis X (in FIG. 3) perpendicular to the plane containing the hinge pin of the flap 30 and parallel to the longitudinal axis of the nacelle, using a hinge bracket 22 secured to the cowl 20. In the rest of the description, this plane will be designated plane P.

Preferably, the pivot axis X of the lever assembly 50 is placed as close as possible to the downstream periphery of the reverser flap 30.

A first lever arm 51 is secured to the front frame 1 via a first rod 61 hinged around an axis perpendicular to the plane P, this first rod 61 being intended to sweep a quasi-planar surface parallel to the aforementioned plane P.

The second lever arm 52 is secured, by a first ball joint link 3, to one end of a second rod 62 connected, at the opposite end, by a second ball joint link 4, to the downstream end of the reverser flap 30.

Furthermore, in a first embodiment, a rigid link 53 secures the first lever arm 51 to the adjacent end of the second lever arm 52.

It should be noted that alternative embodiments are possible. Thus, one embodiment illustrated in FIG. 10 provides for an assembly forming a lever in which the two lever arm 51, 52 form a single and same piece 55 that is substantially triangular, the function remaining identical to that previously described.

Inasmuch as the pivot axis X, the lever assembly 50 and the fastening points of the two lever arms 51, 52 to the corresponding driving rods 61, 62 are placed in plane P, the torsional stresses of the assembly forming the lever 50 are reduced.

To minimize the bulk of the driving system 40 of the reverser flap 30 associated with that stress, one alternative embodiment then provides for tilting the lever assembly 50 by several degrees relative to the normal at plane P.

Furthermore, it should be noted that to limit the risks respectively of vibration or of vibration and buckling for the first and second rods 61, 62, the latter preferably have a fine tubular section, making it possible to give them strong bending rigidity.

Furthermore, one of the ball joint links 3 and 4 of the second driving rod 62 either with the reverser flap 30 or with the second lever arm 52 is associated with an elastic means (not illustrated) of the spring type making it possible to pull on the reverser flap 30 in the direct jet position to limit vibrations.

Figure 3:
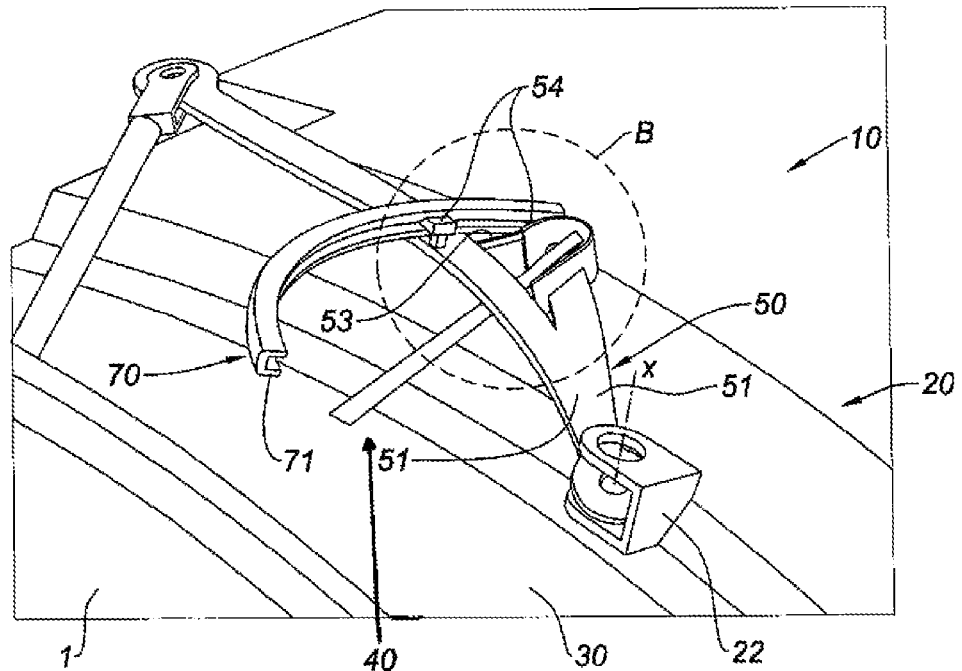
FIG. 3 is an enlarged view of zone A of the reverse thrust device of FIG. 2, centered on a system for driving a reverser flap of the device.
Figure 4:
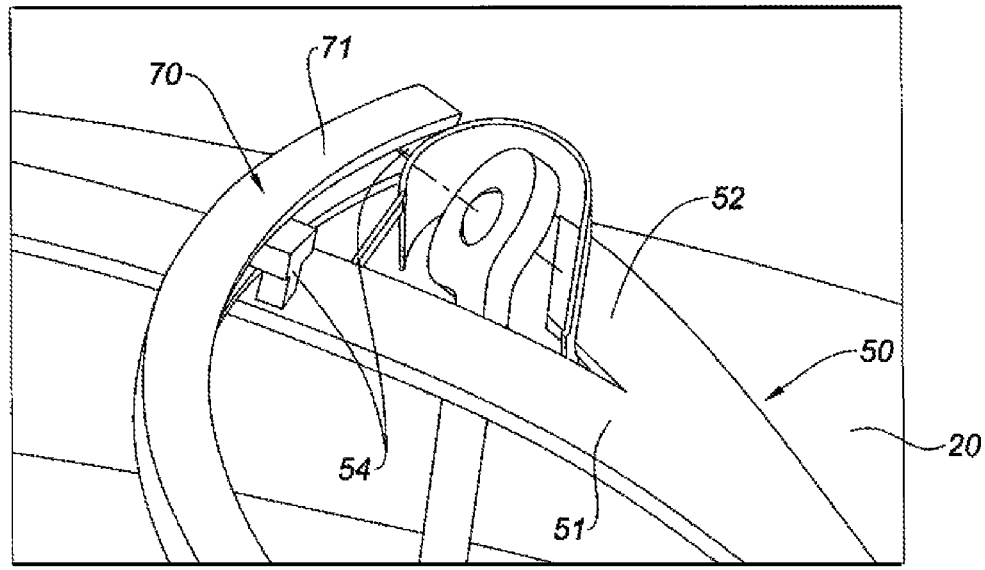
FIG. 4 is an enlarged view of zone B of the system for driving a reverser flap of FIG. 3.

Furthermore, as illustrated in FIGS. 2 to 4, a means 70 is provided for rotationally guiding the assembly forming the lever 50 around its pivot axis X, so as to ensure the stability thereof during pivoting.

In one embodiment, the rotational guiding means 70 comprises a guide rail 71 secured to the mobile cowl 20.

This guide rail 71 assumes an arc of circle shape centered on the pivot axis X of the assembly forming the lever 50 and a general U-shaped section.

Inasmuch as the two lever arms 51, 52 are secured in rotation, the guide rail 71 cooperates with a sliding means 54 having a complementary shape formed on the first lever arm 51 and/or on the second lever arm 52, this means 54 being intended to be received and slide along the guide rail 71.

In one non-limiting example of the present invention, the end of the second lever arm 52 provided with a first pad on the one hand, and the middle part of the first lever arm 51 at the rigid link 54 with the second lever arm 52 provided with a second pad, on the other hand, are thus received in the guide rail 71.

This allows the first and second lever arms 51 and 52 to slide successively along the guide rail 71.

These two contact points of the lever assembly 50 in the guide rail 71 prevent any movement of said assembly 50 outside its rotational movement and thereby ensure its stability.

Such a guide device could also be placed at the junction between the first connecting rod 61 and the first lever arm 51 so as to prevent the vibration of the first connecting rod 61—first lever arm 51 assembly.

Furthermore, this rotational guiding means 71 ensures the reaction of the forces perpendicular to the longitudinal axis of the nacelle and coming from the driving rods 61, 62 during end-of-transit and reverse jet phases of the reverse thrust device 10.

Figure 6:
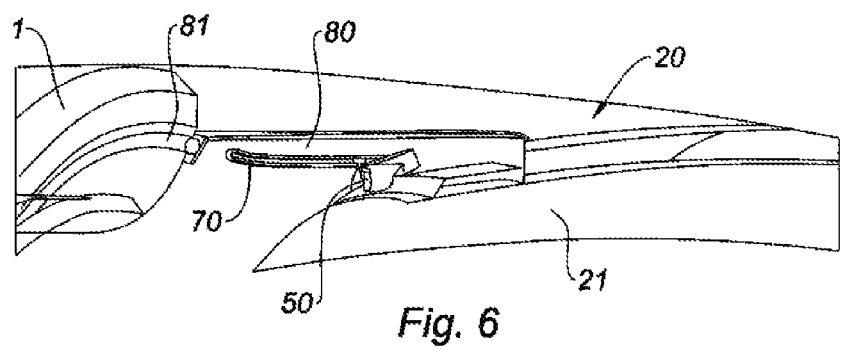
FIG. 6 is a partial side view of the reverse thrust device of FIG. 1.

Furthermore, as illustrated in FIG. 6, the assembly forming the lever 50 and the rotational guide means 70 thereof are placed radially below a sealing membrane 80 of the cowl 20 extending, upstream, the inner acoustic panel 21 of the cowl 20.

In a known manner, the sealing membrane 80 comprises an upstream sealing means 81 (also illustrated in FIG. 1) of the cowl 20 with the front frame 1, ensuring the sealing of the tunnel, of the sealing joint type.

The particular position of the lever assembly 50 and the rotational guiding means 70 thereof offers the advantage of not affecting the sealing of the tunnel.

Furthermore, it is necessary to be able to evacuate the air captured by the inlet of the jet engine equally in direct or reversed jet, and more particularly during thrust reversal, during which it must be possible to offset the reduction of the section of the tunnel V by the reverser flaps 30 by the increase in the section of the opening offered, upstream of the device 10, by the cascade vanes 2 when they are uncovered by the withdrawal of the cowl 20.

Figure 5:
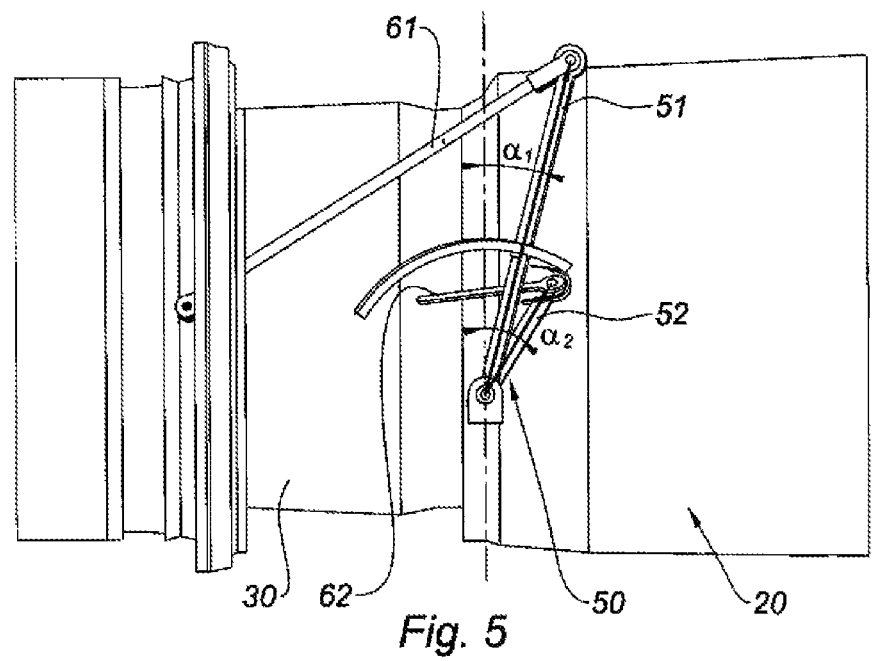
FIG. 5 is a partial top view of the reverse thrust device of FIG. 1.

Advantageously, in reference to FIG. 5, these particular opening kinematics of the reverser flap 30 and the cowl 20 depend on a first angle $\alpha 1$ and a second angle $\alpha 2$ respectively formed by the first 51 and second 52 lever arms with the transverse hinge pin of the reverser flap 30.

More precisely, the first angle $\alpha 1$ between the first lever arm 51 and the transverse hinge pin of the reverser flap 30 is relatively small, and smaller than the second angle $\alpha 2$ formed between the second lever arm 52 and that same axis.

In one non-limiting example of the present invention, the first angle $\alpha 1$ can be in the vicinity of 10 to 15°, while the second angle $\alpha 2$ can be in the vicinity of 25 to 35°

Thus, the first small angle $\alpha 1$ makes it possible to limit the angular displacement of the assembly forming the lever 50 for a given axial movement of the cowl 20, while the second, larger angle $\alpha 2$ of the second lever arm 52 limits the axial movement of the second rod 62 for a same angular movement of the lever assembly 50.

When the reverse thrust device 10 goes from a direct jet configuration to a reverse jet configuration, a gradual pivoting of the reverser flap 30 is then controlled in the tunnel V at the beginning of the transit when the air flow passing through the vanes 2 is still low, due to the small degree of opening of the cowl 20.

This minimization of the pivoting of the reverser flap 30 at the beginning of transit makes it possible to keep a total air exhaust section that is always sufficient relative to the air intake section and practically constant irrespective of the configuration of the device 10, in particular in the reverse thrust configuration.

Furthermore, the second limited angle $\alpha 2$ of the second lever arm 52 offers the advantage of reducing interference between the second rod 52 and the cowl 20 by the clearance necessary to integrate the second rod 52.

In fact, a larger second angle would lead to pulling back the anchoring point of the second rod 52 and, as a result, making it interfere with the cowl 20 during pivoting thereof.

The operating mode of the reverse thrust device 10 according to the invention is as follows.

First, the cowl 20 is closed. The reverse thrust device 10 is in the direct jet configuration.

When the opening of the cowl 20 is actuated, one or more actuators (not shown) translate the mobile cowl 20 in the downstream direction of the nacelle.

In so doing, the pivot axis X of the lever assembly 50, attached to the cowl 20, also moves in the downstream direction of the nacelle, causing a rotational movement of the lever assembly 50.

More specifically, the translational movement of the pivot axis X of the assembly forming the lever 50 is converted into a rotation of the first 51 and second 52 lever arms, the pads 54 of the latter successively sliding in the rotational guide rail 71 of the assembly forming the lever 50.

This rotational movement of the first and second lever arms 51, 52 is accompanied, owing to the second driving rod 62, by the pivoting of the reverser flap 30 toward its position covering the tunnel.

In one non-limiting example of the present invention, the ratio of the lever arms 51, 52 defined as the ratio between the distance from the pivot axis X to the fastening point of the first rod 61 and the distance from the pivot axis X to the fastening point of the second rod 62 is approximately two, but can be modified, if necessary by adjusting the lengths of the lever arms 51, 52.

Such a ratio of the lever arms makes it possible to convert the translational travel of the cowl 20 into a rotational movement half as significant to pivot the reverser flap 30.

Figure 7:
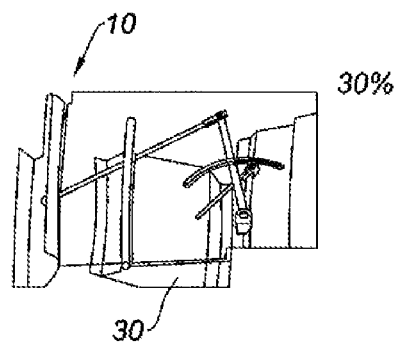
FIGS. 7 to 9 are partial perspective views of the reverse thrust device of FIG. 1 in the transit configuration, having different successive pivoted positions of the thrust reverser flaps between a direct jet and a reversed jet.
Figure 8:
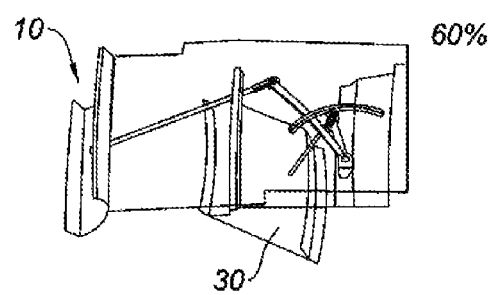
Figure 9:
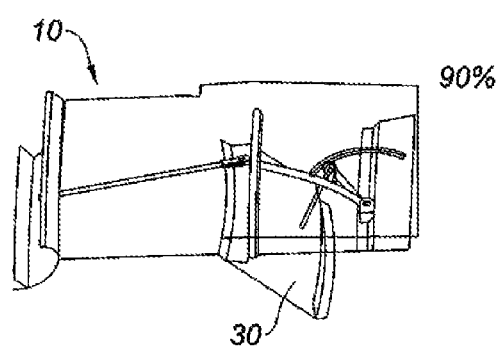

FIGS. 7 to 9 show the reverse thrust device 10 in the so-called transit configuration, in which the reverser flap 30 has different pivoting positions between its retracted position and its final position covering the tunnel.

More specifically, these figures illustrate covering of the tunnel by the reverser flap 30, respectively of 30%, 60% and 90%.

Owing to the present invention, the opening kinematics of the flap 30 and the cowl 20 are isostatic, i.e. a position of the mobile cowl 20 has a corresponding particular position of the reverser flap 30, while keeping a quasi-constant air passage section when the flap(s) are pivoted to the position thereof covering the tunnel, during thrust reversal.

Such a reverse thrust device 10 is particularly, but not exclusively, adapted to jet engines with a large bypass ratio.

Although the invention has been described with one particular embodiment, it is of course in no way limited thereto and encompasses all technical equivalents of the means described, as well as combinations thereof if they are within the scope of the invention.

The invention claimed is:

1. A jet engine nacelle reverse thrust device, comprising:
a means for diverting at least one portion of a jet engine air flow;
at least one cowl that is translatable in a direction substantially parallel to a longitudinal axis of the nacelle;
at least one flap that is pivotably mounted, by one end, onto the translatable cowl, said translatable cowl being capable of passing alternately from a closed position, wherein said translatable cowl, with the flap in a retracted position, ensures the aerodynamic continuity of the nacelle and covers the diverting means, to an open position, wherein said translatable cowl opens a passage in the nacelle and uncovers the diverting means, the flap being in a pivoted position wherein the flap is capable of sealing off a portion of an annular channel of the nacelle; and
a system for driving the flap, said system including at least one lever assembly that is pivotably mounted onto the translatable cowl and is hinged about each of the ends thereof through drive rods, the drive rods being coupled to the flap and to a stationary structure of the jet engine nacelle reverse thrust device.

2. The jet engine nacelle reverse thrust device according to claim 1, wherein said at least one lever assembly comprises first and second lever arms, each respectively fastened, through the drive rods, on the stationary structure and on the flap and pivotably mounted on the translatable cowl.

3. The jet engine nacelle reverse thrust device according to claim 2, wherein said at least one lever assembly is placed in a plane containing a hinge pin of the flap and an axis parallel to the longitudinal axis of the device.

4. The jet engine nacelle reverse thrust device according to claim 2, wherein kinematics for changing a position of the flap depend on first and second angles respectively formed by the first and second lever arms with a hinge pin of the flap.

5. The jet engine nacelle reverse thrust device according to claim 4, wherein the first angle is smaller than the second angle.

6. The jet engine nacelle reverse thrust device according to claim 2, wherein the first and second lever arms are secured in rotation.

7. The jet engine nacelle reverse thrust device according to claim 2, wherein the first lever arm has a length longer than that of the second lever arm.

8. The jet engine nacelle reverse thrust device according to claim 2, further comprising means for guiding rotation of said at least one lever assembly.

9. The jet engine nacelle reverse thrust device according to claim 8, wherein the means for guiding the rotation of said at least one lever assembly comprises at least one guide rail secured with the translatable cowl and centered on an axis of rotation of the first and second lever arms, said at least one guide rail being intended to cooperate with sliding means with a complementary shape formed on the first or second lever arm.

10. The jet engine nacelle reverse thrust device according to claim 8, wherein the means for guiding said at least one lever assembly in rotation comprises at least one guide rail secured to the translatable cowl and centered on an axis of rotation of the first and second lever arms, said at least one guide rail being intended to cooperate with sliding means with a complementary shape formed on the first and second lever arms so that the first and second lever arms successively slide along said at least one guide rail.

11. The jet engine nacelle reverse thrust device according to claim 8, wherein said at least one lever assembly and the means for guiding the rotation of said at least one lever assembly are placed under a sealing membrane placed upstream of the translatable cowl.

12. The jet engine nacelle reverse thrust device according to claim 2, wherein a second driving rod forms a ball joint connection with the flap and the second lever arm.

13. A dual flow jet engine nacelle comprising the jet engine nacelle reverse thrust device according to claim 1.

* * * * *